3,448,145
PROCESS FOR THE PRODUCTION OF 2,5-DIHYDROXYTEREPHTHALIC ACID
Hermann Zorn, Vienna, and Heinrich Till, Schaftenau, Austria, assignors to Alpine Chemische Aktiengesellschaft, Kufstein, Tyrol, Austria
No Drawing. Filed Aug. 30, 1965, Ser. No. 483,800
Claims priority, application Austria, Sept. 2, 1964, A 7,551/64; July 9, 1965, A 6,606/65
Int. Cl. C07c 65/04, 51/00
U.S. Cl. 260—521                                    7 Claims

ABSTRACT OF THE DISCLOSURE

An improved process, for the production of 2,5-dihydroxyterephthalic acid according to the Kolbe-Schmitt synthesis is effected by reacting hydroquinone with carbon dioxide in the presence of 1.2 to 2.8 moles of water per mole of hydroquinone.

---

This invention relates to improvements in the process for the production of 2,5-dihydroxyterephthalic acid according to the Kolbe-Schmitt synthesis.

It is known that water-free alkali compounds of hydroquinone or dry mixtures of hydroquinone and alkali compounds, on reaction with dry carbon dioxide at elevated temperatures under superatmospheric pressure, yield the salts of 2,5-dihydroxyterephthalic acid. In the mode of operation hitherto used the reaction product is subsequently dissolved in water, the solution filtered, and the free acid precipitated from the filtrate by means of a mineral acid. This procedure, however, has certain disadvantages: the reaction product is very hard and much labour must be expended on its removal from the pressure vessel and its comminution. Decomposition products are very apt to be formed, resulting in loss of starting material and considerable difficulties in filtration. After filtration and acidification of the solution, the diacid separates in a very impure form.

In the preparation of certain aromatic monohydroxycarboxylic acids by the Kolbe-Schmitt synthesis several attempts have been made to overcome the difficulty caused by the product caking and adhering firmly to the walls of the pressure vessel—a circumstance which obstructs continuous performance of such processes—by using indifferent solvents or suspending agents.

In the process of the present invention an aromatic dihydroxycarboxylic acid is produced by way of the Kolbe-Schmitt route by conducting the reaction in an indifferent solvent which maintains the starting and the final products largely in suspension. The success of this process was unexpected, since suspension in toluene for the production of the disodium salt of 2-hydroxynaphthalene-1-carboxylic acid is considered to have a decidedly adverse effect (cf. German patent specification 817,758). The use of xylene, which is closely related to toluene in dissolving properties, has nevertheless been found highly advantageous for the present process. This operational measure not only permits the reaction to be carried out continuously but also lessens the tendency to the formation of decomposition products so that the solutions of the reaction product show far better filterability than is the case when no suspending agent is used.

Hydrocarbons and mixtures of hydrocarbons of high boiling point are very suitable as suspending agents, especially those which boil at temperatures superior to 135° C., for example between 135° and 350° C., and do not show unduly high viscosity at room temperature. Examples of these belonging to the aromatic series are orthoxylene and metaxylene, xylene mixtures, ethylbenzene, methoxybenzene, ethoxybenzene, tetrahydronaphthalene, decahydronaphthalene, methylnaphthalenes, and solvent naphtha having a boiling point of at least 140° C.; examples belonging to the aliphatic series are gas oil paraffin oil and paraffinic hydrocarbons with a boiling point of at least 140° C., such as alkanes having 9 to 18 carbon atoms. Of course hydrocarbons and hydrocarbon mixtures with a boiling point below 135° C. can also be used, for example toluene, solvent naphtha of boiling point 100° to 140° C., n-octane, or a gasoline mixture of boiling point 100° to 140° C., but in this case due account must be taken of the fact that the vapour pressure of toluene at the reaction temperature is substantially higher than that of a xylene mixture.

The amount of suspending agent must be so calculated that the mixture is well stirrable. Suitable amounts are, for example, 250 to about 800 parts, or preferably 400 to 500 parts, for a batch containing 55 parts of hydroquinone.

When the starting products are water-free alkali compounds of hydroquinone, or dry mixtures of hydroquinone and alkali compounds, and care is taken that no water is introduced into the reaction mixture with the solvents or the carbon dioxide, both caking of the solid materials and the formation of decomposition products are prevented, all the more effectively the more vigorously the mixture is stirred and the smoother the inner surface of the pressure vessel used for the operation. In continuous production thorough blending of the materials can best be achieved with carbon dioxide circulated through the mixture.

As alkali compounds the potassium compounds are preferred: i.e. potassium hydroxide, potassium carbonate any mixtures thereof. The amount of potassium compound to be employed is preferably at least 2 gram atoms of potassium ion per 1 mole of hydroquinone. Although a large excess of potassium compound can be used without inconvenience, an upper limit of about 6 gram atoms of potassium ion per 1 mole of hydroquinone is convenient.

It has further been found that in the synthesis of 2,5-dihydroxyterephthalic acid, in contrast to various other syntheses following the Kolbe-Schmitt route, the presence of limited amounts of water, e.g. 1.2 to 2.8 moles per mol of hydroquinone, with addition of a suspending agent as defined above, is not detrimental but, in fact, has substantial advantages, viz:

(a) The tendency to the formation of decomposition products, which results in loss of material as well as poorly filterable solutions, is lessened.

(b) Synthesis can be effected at lower carbon dioxide pressures.

(c) It is no longer necessary to prepare the reaction mixture without water or to dry it before reacting.

The advantage noted under (a) above is conspicuously evident when conditions obtain which would otherwise greatly promote decomposition effects, for instance feeble stirring action in the course of the reaction or a pressure vessel with rough inner surfaces.

Whereas carbon dioxide partial pressures of 60 to 110 atmospheres overpressure are preferable for the reaction of dry mixtures in the presence of a solvent as suspending agent, very good results are obtained in the presence of a solvent at carbon dioxide partial pressures of 20 to 70 atmospheres overpressure once the water content of the reaction mixture is adjusted to a suitable value, e.g. at total pressures of 40 to 90 atmospheres overpressure when xylene is used as solvent. In all cases the reaction temperature should be within the range of 160° to 240° C.; the reaction takes up to 5 hours.

When 1 mole of hydroquinone and 2.2 to 3 gram atoms of potassium ion are used—the latter in the form of potassium hydroxide, potassium carbonate or a mixture of these compounds—and the mixture is maintained in suspension, the presence of 2.1 to 2.5 moles of water has been found optimal. Thereby carbonisation is almost entirely suppressed, even when the walls of the vessel are coarse textured and the stirring action is weak. In calculating the necessary water addition, allowance must be made for the amounts that are liberated by the formation of hydroquinonate or of the salt. In the reaction of 1 mole of hydroquinone with alkali compounds 2 moles of water are formed by using 2 moles of potassium hydroxide or 1 mole of water and 1 mole of $CO_2$ by using 1 mole of potassium carbonate. Should the amount of water used be less than is necessary while the other reaction conditions are constant and the carbon dioxide pressure is not higher than that just necessary for obtaining the best results at the optimum water content, the yield will be appreciably lower than the maximum and marked carbonisation will occur. The loss in yield can be made good in part by increasing the pressure, but this has virtually no effect on the extent of carbonisation. Should the requisite amount of water be greatly exceeded under otherwise constant reaction conditions, the yield is again very much less than normal and the loss can be partly compensated for only by applying disproportionately high carbon dioxide pressures. If this compensating measure is omitted, decomposition effects reoccur to a yet more pronounced degree.

The way in which the water is incorporated in the reaction mixture is significant only for the technical performance of the synthesis, although it is essential that it already be present when the Kolbe-Schmitt reaction is initiated. For example, the water can be mixed in liquid form with the reaction mixture of hydroquinone, potassium carbonate and/or potassium hydroxide and the chosen solvent, or water vapour or carbon dioxide charged with water vapour, can be injected into a mixture under pressure, or again the requisite volume of water can be taken from the mother lye left over from the previous purification operations, when the dipotassium salt of the 2,5 - dihydroxyterephthalic acid is crystallised out of the hot filtered aqueous solution of the reaction product with cooling.

It has also been found that in the presence of limited amounts of water, e.g. 1.2 to 2.8 moles, especially 2.0 to 2.5 moles, per mole of hydroquinone, the reaction can be carried out with a very good yield even without employing an indifferent solvent or a suspending agent.

Further, it has been found that the potassium and ammonium salts of 2,5 - dihydroxyterephthalic acid are well soluble in water on heating but only moderately soluble at room temperature, a circumstance which permits the acid to be obtained in a simple manner in a high degree of purity. Thus, for example, on completion of the reaction involving potassium compounds and elimination of residual solvent, the reaction product can be dissolved in hot water, the hot solution filtered and allowed to cool to room temperature or preferably cooled to below the temperature, upon which the greater part of the 2,5-dihydroxyterephthalic acid crystallises in the form of the dipotassium salt. This is freed from the mother lye by filtering with suction and dissolved in hot water, and the desired acid is precipitated from the hot solution with mineral acid. After filtration, washing and drying, a pale yellow product of high purity is obtained. The small amounts of 2,5 - dihydroxyterephthalic acid precipitated from the mother lye with mineral acid are heavily contaminated; this proportion of acid can be converted once again into the dipotassium salt and treated in the aforedescribed manner, or alternatively it can be reacted with ammonia and purification effected on similar lines by way of the diammonium salt.

Finally it has been discovered that the action of atmospheric oxygen on 2,5 - dihydroxyterephthalic acid gives rise to dark coloured oxidation products, these being formed very slowly on heating but at a notable speed in alkaline medium. When the reaction product is worked up in such a way that its alkaline solutions are not exposed to the entry of air for more than a minimum of time, only minor disadvantages in respect of yield and purity are experienced. These disadvantages can be entirely avoided by adding to the alkaline solution a reducing agent, e.g. sodium bisulfite, unless operation in an oxygen-free atmosphere is preferred.

Therefore in each application of the process here described care is taken to limit to a minimum the time of exposure to atmospheric oxygen of the solutions of the salts of 2,5 - dihydroxyterephthalic acid. In those instances where a longer period of exposure at elevated temperature is unavoidable, about 1 part of sodium bisulfite per 1000 parts is included in each solution.

The 2,5 - dihydroxyterephthalic acid can be reacted with glycols for the manufacture of linear polyesters and, especially in mixture with terephthalic acid, or copolyesters possessing fiber- or film-forming properties. For this purpose it is preferably first converted into a dialkyl ester, e.g. the dimethyl ester, which is transesterified with a glycol such as ethyleneglycol and 1,4 di-(hydroxymethyl)-cyclohexane, then polycondensed and worked up to form filaments, threads, films or mouldings.

The following examples illustrate the invention without limiting its scope. The parts and percentages given therein are by weight and the temperatures in degrees centigrade.

EXAMPLE 1

A glass vessel fitted with a removable cover and a water separator with attached reflux condenser is charged with 55 parts of hydroquinone, 56 parts of crushed potassium hydroxide, 35 parts of potassium carbonate and 400 parts of technical xylene. The mixture is maintained at the boil and nitrogen free from oxygen is conducted through it until no further water separates. On cooling, the entire mixture is transferred as quickly as possible into an autoclave of a capacity of 2000 parts by volume. The autoclave is closed, the stirring device set in motion at once and the air ejected with carbon dioxide. All the inner surfaces of the pressure vessel are brightly polished and it is equipped with a magnetic stirrer actuating in an up and down movement (average length of stroke 90 millimetres) a perforated disk with short gripping arms. In the de-aeration and the subsequent pressurising operations the carbon dioxide is conducted in through a pipe dipping nearly to the bottom of the vessel. When all the air has been expelled the mixture is heated to 50° and pressurising with carbon dioxide carried out until 60 atmospheres overpressure are reached at the stated temperature. The stirring speed is then adjusted to about 150 strokes per minute and the mass heated to 220°, at which temperature the total pressure increases to approximately 110 atmospheres overpressure. Four hours after the reaction temperature of 220° is reached, the heating is turned off, the mixture allowed to cool and then blow off. The solid materials are of grey-green colour. They are filtered free from xylene with suction and dissolved in 1500 parts of hot water containing sodium bisulfite. The solution is boiled for a short time to eliminate the last traces of xylene, on which it can be filtered with ease, leaving only a slight residue on the filter. The hot filtered solution is cooled to about 8° for the salts to crystallise. These are filtered off, washed with a small volume of ice water and then dissolved in 2000 parts of hot water. To the solution is added an amount of 37% hydrochloric just sufficient to ensure that no further 2,5-dihydroxyterephthalic acid is precipitated, after which 50 parts are added in excess of this amount. After standing for 1 hour at the aforestated temperature, the solution is cooled to room temperature, the pale yellow precipitate filtered off, washed with cold water and dried at 100° and 20 torr. 81 parts of the reaction product are obtained. On the addition of excess hydrochloric acid to the mother lye of the crystallised salt, a black-brown precipitate of contaminated 2,5-dihydroxyterephthalic acid is obtained. This is dissolved in just the necessary amounts of potassium hydroxide and water with heating, the solution filtered hot and cooled for crystallisation of the dipotassium salt of 2,5-dihydroxyterephthalic acid, which is then treated further as described above. A further 9 parts of the product are obtained. The total yield is thus 81+9=90 parts of 2,5-dihydroxyterephthalic acid, which is equivalent to approximately 91% of the theoretical yield in relation to the hydroquinone used.

EXAMPLE 2

55 parts of hydroquinone, 56 parts of crushed potassium hydroxide, 35 parts of anhydrous potassium carbonate, 3 parts of water and 400 parts of technical xylene are entered into an autoclave of the same size and construction as that used in Example 1. The water content of the batch, including the water arising from the formation of the hydroquinonate, amounts to 2.33 moles per mole of hydroquinone. The inner surfaces of this vessel, however, are rough and the magnetic stirrer moves in an up and down movement a perforated disk without arms. As soon as the stirring mechanism is set in motion, the autoclave is closed and the air driven out with carbon dioxide. The mixture is heated to 50°, then dry carbon dioxide is pressurised until 45 atmospheres overpressure are attained. In the de-aeration and pressurising operations the carbon dioxide flows in through a tube dipping nearly to the bottom of the pressure vessel. The stirring speed is adjusted to 50 strokes per minute and the temperature to 210°; the pressure is then 80 atmospheres overpressure and increases to 83 atmospheres overpressure in the course of the reaction. Three hours after 210° is reached, the heating is turned off, the contents allowed to cool and subsequently blown off. The solid substances are of yellow-green colour. They are filtered free from xylene with suction, dissolved in 1500 parts of hot water containing sodium bisulfite, and the final traces of xylene are eliminated by boiling the solution for a short time. After this it is well filterable and practically no residue remains on the filter. The further treatment of the product is as described in Example 1.

The yield totals 93 parts of 2,5-dihydroxyterephthalic acid, which is equivalent to approximately 94% of theory, vantage by 3.1 parts of the mother lye left over from a previous crystallisation of the dipotassium salt, or they can be introduced into the pressure vessel in the form of based on the amount of hydroquinone used.

The 3 parts of water can be replaced without disadwater vapour or of carbon dioxide charged with water vapour.

EXAMPLE 3

55 parts of hydroquinone, 56 parts of crushed potassium hydroxide 35 parts of potassium carbonate and 400 parts of technical xylene are entered into a glass vessel with a removable cover and fitted with a water separator and the reflux condenser belonging thereto. The mixture is maintained at the boil and oxygen-free nitrogen conducted through it until no further water separates. After cooling, the entire mixture is entered as quickly as possible into the autoclave used in Example 2. The stirrer is set in motion, the autoclave closed immediately and the air driven out with carbon dioxide. The temperature is then increased to 50°, and at this temperature dry carbon dioxide is pressurised until 45 atmospheres overpressure are obtained. In de-aeration and pressurising the carbon dioxide flows into the vessel through a pipe dipping nearly to the bottom of the pressure vessel. The stirring speed is adjusted to 50 strokes per minute and the temperature to 210°, upon which 77 atmospheres overpressure are obtained which increases to 79 atmospheres overpressure in the course of the reaction. The further procedure is the same as in Example 1, with the difference that the solids removed from the autoclave are of black-brown colour and are not completely soluble in water; the aqueous solution shows poor filterability and substantial amounts of coke-like products remain on the filter. The total yield is 66 parts of 2,5-dihydroxyterephthalic acid which is equivalent to about 67% of theory on the amount of hydroquinone used.

EXAMPLE 4

The composition of the reaction mixture and the reaction procedure are as described in Example 2, except that 12 instead of 3 parts of water are used. The water content of the batch, including the water arising from the formation of the hydroquinonate, amounts to 3.33 moles per mole of hydroquinone. When the reaction temperature is reached, 85 atmospheres overpressure are obtained, which increases to 88 atmospheres overpressure during the reaction. Here again the solid substances taken from the autoclave are of black-brown colour and cannot be completely dissolved in water; the solution is very difficult to filter and a considerable amount of cokelike products remains on the filter. The yield totals 42 parts of 2,5-dihydroxyterephthalic acid, which is equivalent to approximately 42% of theory calculated on the hydroquinone.

EXAMPLE 5

110 parts of hydroquinone, 120 parts of crushed potassium hydroxide and 800 parts of decahydronaphthalene are entered in the autoclave used for the reaction of Example 1. The reaction procedure corresponds to that of Example 1 with two differences: firstly, instead of sodium bisulfite being added to the salt solutions they are treated in the absence of air, and secondly, on precipitation from the mother lye of the crystalline salt with hydrochloric acid the amount of impure 2,5-dihydroxyterephthalic acid is not separately purified but simply added to the reaction product obtained in the next identical trial and worked up with it. The second trial, in the course of which the contaminated amount from the first is worked up with the products and the resulting impure part held over for the third trial, yields 178 parts of the pure acid.

EXAMPLE 6

The pressure vessel used in Example 2 is charged with 55 parts of hydroquinone, 22.4 parts of crushed potassium hydroxide, 90 parts of anhydrous potassium carbonate and 450 parts of technical xylene. The water content of the mixture, including the water arising from the formation of the hydroquinonate, is 1.2 moles per mole of hydroquinone. The reaction is effected in the manner described in Example 2. The yield is 84 parts of 2,5-dihydroxyterephthalic acid, which is equivalent to 85% of theory calculated on the amount of hydroquinone used.

EXAMPLE 7

A mixture of 55 parts of hydroquinone, 56 parts of crushed potassium hydroxide, 35 parts of anhydrous potassium carbonate, 7.2 parts of water and 500 parts of technical xylene, its water content including that freed by the formation of the hydroquinonate being 2.8 moles per mole of hydroquinone, is reacted with carbon dioxide in accordance with the procedure of Example 2. The yield is 77 parts of 2,5-dihydroxyterephthalic acid, which is equivalent to 78% of theory calculated on the amount of hydroquinone employed.

EXAMPLE 8

55 parts of hydroquinone and 90 parts of potassium carbonate (composition $K_2CO_3 \cdot 1\frac{1}{2}H_2O$) are ground rapidly and the mixture entered into the autoclave used in Example 1. The water content of the batch including the water that arises on formation of the hydroquinonate is 2.63 moles per mole of hydroquinone. The pressure vessel, the stirring mechanism and the bottom outlet pipe of which have been previously removed, is closed at once and the air driven out with carbon dioxide. The temperature is then raised to 50° and pressurising with dry carbon dioxide is continued until 45 atmospheres overpressure are obtained at this temperature. Subsequently the batch is heated to 210°, at which the pressure increases to 86 atmospheres overpressure and thereafter remains fairly constant throughout the reaction. Four hours after reaching 210° the heating is turned off, the batch allowed to cool and then blown off. A solid grey reaction product is obtained which can be detached from the walls of the vessel with little difficulty. The pieces are then reduced in size and dissolved in 1500 parts of hot water containing sodium bisulfite. The solution can be filtered without great difficulty, although its filterability is distinctly inferior to that of the product of Example 1 and the amount of residue left on the filter is greater than with that product. The subsequent working up of the product is as described in Example 1. The total yield is 81 parts of 2,5-dihydroxyterephthalic acid, which is equivalent to approximately 82% of theory calculated on the amount of hydroquinone used.

EXAMPLE 9

55 parts of hydroquinone and 76 parts of anhydrous potassium carbonate are reacted as described in Example 8. At 210° the pressure amounts to 75 atmospheres overpressure. The reaction product is of brown-black colour and some effort is required to remove it from the walls of the vessel. The pieces are then reduced in size and dissolved in 1500 parts of hot water containing sodium bisulfite. The solution shows very poor filterability and substantial amounts of coke-like products are left on the filter. The product is worked up further as described in Example 1. The total yield is 64 parts of 2,5-dihydroxyterephthalic acid, which is equivalent to about 65% of theory calculated on the amount of hydroquinone used.

EXAMPLE 10

10 parts of heavily contaminated 2,5-dihydroxyterephthalic acid are dissolved in a mixture of 10 parts of 25% aqueous ammonia solution and 90 parts of water at 95°. The solution is filtered hot and then cooled to 8°. A crystalline product settles out, which is filtered from the mother lye with suction and dissolved in hot water made very weakly alkaline with ammonia. On acidification of the solution a pale yellow product separates out. This is filtered off, washed with cold water and dried. 6 parts of 2,5-dihydroxyterephthalic acid are obtained. On acidification of the mother lye a black-brown precipitate is formed, which as before is dissolved in water containing ammonia and submitted to the purification operation. A further 3 parts of 2,5-dihydroxyterephthalic acid are obtained from the mother lye.

Having thus disclosed the invention what we claim is:

1. A process for the production of 2,5-dihydroxyterephthalic acid which consists essentially of reacting, at a temperature between 160° and 240° C., and under superatmospheric pressure in the presence of 1.2 to 2.8 moles of water per mole of hydroquinone, (A) a member selected from the group consisting of (1) an alkali compound of hydroquinone and (2) a mixture of hydroquinone and an alkali compound selected from the group consisting of alkali hydroxide, alkali carbonate and a mixture thereof with (B) carbon dioxide.

2. A process according to claim 1 which is carried out in an organic solvent selected from the group consisting of n-octane, alkanes having 9 to 18 carbon atoms, toluene, solvent naphtha having a boiling point of at least 100° C., a gasoline mixture of boiling point 100° to 140° C., gas oil, paraffin oil, ethylbenzene, methoxybenzene, ethoxybenzene, tetrahydronaphthalene, decahydronaphthalene and methylnaphthalenes.

3. A process according to claim 1 which is carried out in an organic solvent selected from the group consisting of ortho-xylene, meta-xylene and xylene mixtures.

4. A process according to claim 2 which is carried out at a carbon dioxide partial pressure between 20 and 70 atmospheres above atmospheric pressure.

5. A process according to claim 3 which is carried out at a carbon dioxide partial pressure between 40 and 90 atmospheres above atmospheric pressure.

6. A process according to claim 1 in which the alkali compound is selected from the group consisting of potassium hydroxide, potassium carbonate and a mixture of these compounds.

7. A process according to claim 1 wherein the ratio of hydroquinone to potassium ions to water is 1:(2.2 to 3):(2.1 to 2.5), the water produced by hydroquinonate formation being taken into account.

References Cited

UNITED STATES PATENTS

| | | | |
|---|---|---|---|
| 2,807,643 | 9/1957 | Hartley | 260—521 |
| 2,453,105 | 11/1948 | Wolthius et al. | 260—520 |

FOREIGN PATENTS

| | | |
|---|---|---|
| 734,622 | 8/1955 | Great Britain. |
| 738,359 | 10/1955 | Great Britain. |

LORRAINE A. WEINBERGER, *Primary Examiner.*

D. STENZEL, *Assistant Examiner.*